United States Patent [19]

Cooper et al.

[11] Patent Number: 5,766,026
[45] Date of Patent: Jun. 16, 1998

[54] ELECTRICAL CONNECTOR ASSEMBLY WITH SEALED AND SPRING BIASED ELECTRICAL COMPONENT

[75] Inventors: Ralph Melvin Cooper, Clemmons; Donald Gray Stillie, Winston-Salem, both of N.C.

[73] Assignee: The Whitaker Corporation, Wilmington, Del.

[21] Appl. No.: 533,473

[22] Filed: Sep. 25, 1995

Related U.S. Application Data

[63] Continuation-in-part of Ser. No. 320,621, Oct. 7, 1994, Pat. No. 5,452,948.

[51] Int. Cl.⁶ ............................................. H05K 7/02
[52] U.S. Cl. ........................ 439/76.1; 361/736; 439/559
[58] Field of Search ............................. 439/76.1, 76.2, 439/74, 75, 567, 572, 559; 361/736, 742

[56] References Cited

U.S. PATENT DOCUMENTS

| | | | |
|---|---|---|---|
| 4,112,481 | 9/1978 | Roge et al. | 361/736 |
| 4,661,888 | 4/1987 | Jewell et al. | 361/692 |
| 4,668,873 | 5/1987 | Ohba | 361/736 |
| 4,697,863 | 10/1987 | Galloway et al. | 439/544 |
| 4,785,532 | 11/1988 | Galloway et al. | 29/827 |
| 4,842,525 | 6/1989 | Galloway et al. | 439/34 |
| 4,873,615 | 10/1989 | Grabbe | 361/742 |
| 5,000,690 | 3/1991 | Sonobe et al. | 439/76.1 |
| 5,374,114 | 12/1994 | Burgdorf et al. | 303/119.2 |
| 5,407,260 | 4/1995 | Isshiki et al. | 303/119.2 |
| 5,408,383 | 4/1995 | Nagasaka et al. | 361/707 |
| 5,449,227 | 9/1995 | Steinberg et al. | 303/119.2 |
| 5,452,948 | 9/1995 | Cooper et al. | 303/119.2 |

FOREIGN PATENT DOCUMENTS 516149   12/1992   European Pat. Off. .............. 361/736

*Primary Examiner*—Neil Abrams

[57] ABSTRACT

An electrical connector assembly includes a first sealing subassembly having a shielded, fluid impermeable board (48) with a stake pin (44) for fastening the board to a housing (34). Electrical components (16) are fastened to the board, and include pedestals (51) which are in sealing engagement with respective seals (52). The seals provide sealing and spring biasing forces to the components (16), as respective top edges thereof are pressingly engaged by a hydraulic valve apparatus. Thus a fluid seal barrier is created for preventing the passage of fluid to the interior of the electrical connector assembly.

14 Claims, 8 Drawing Sheets

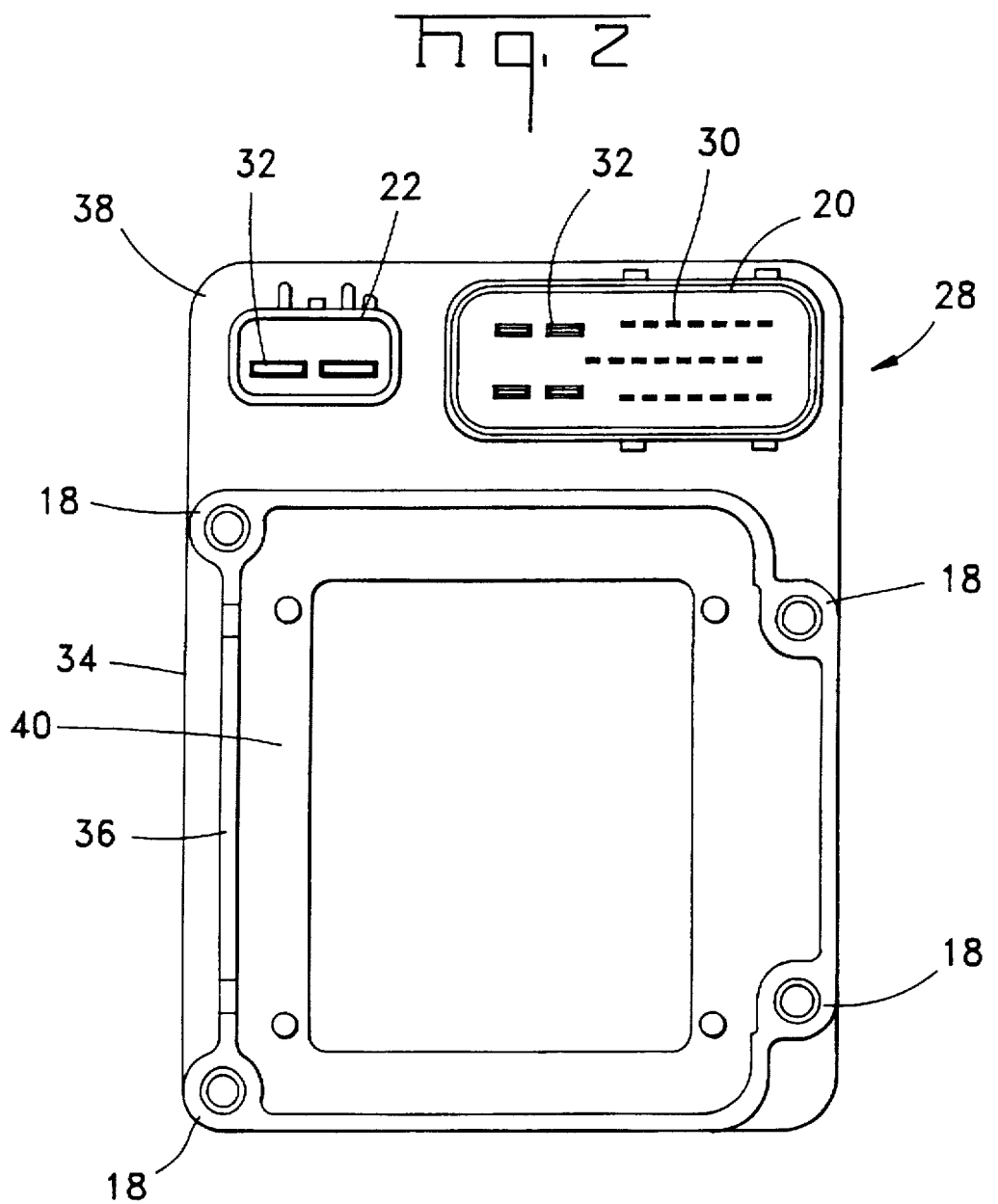

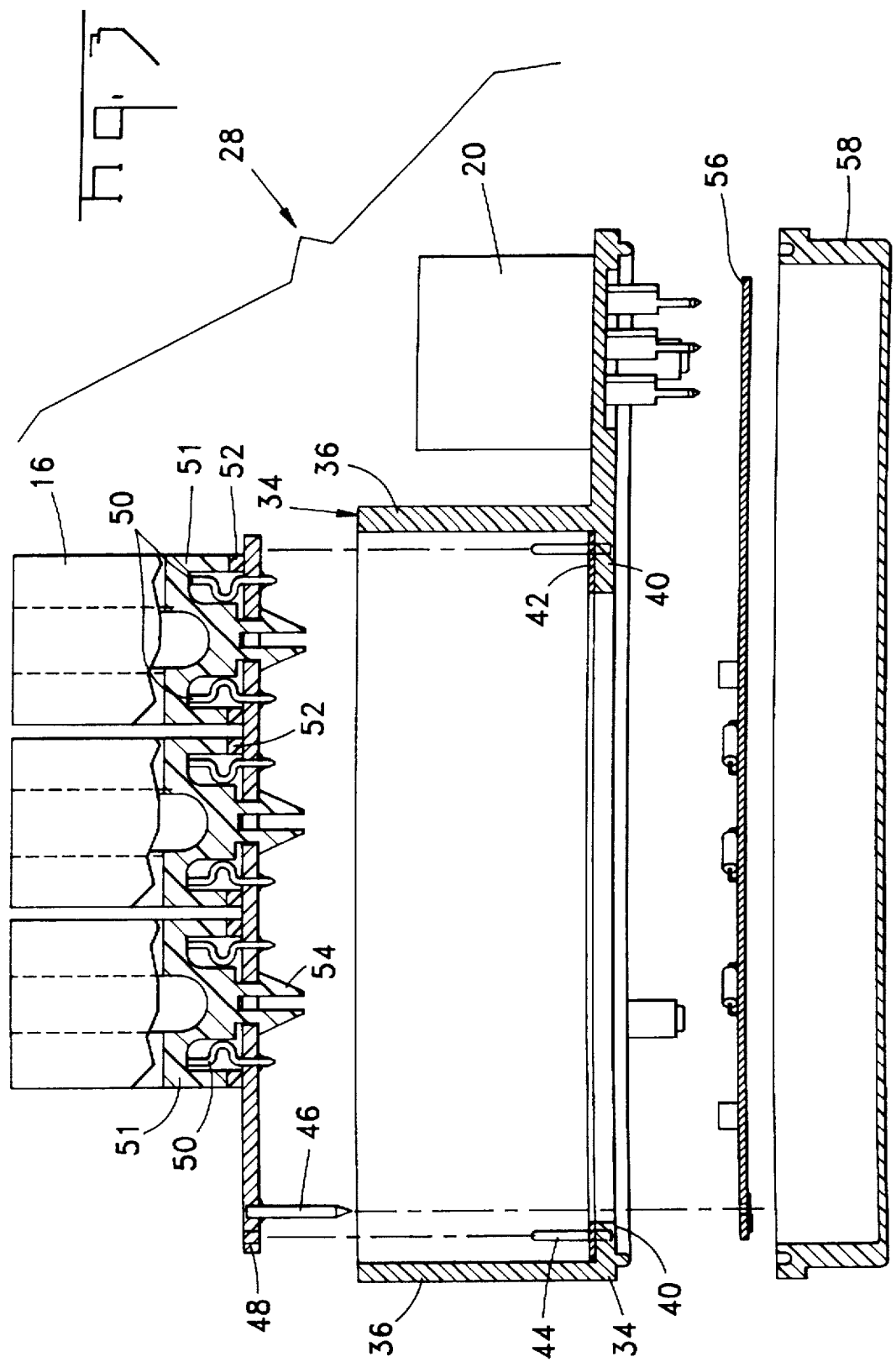

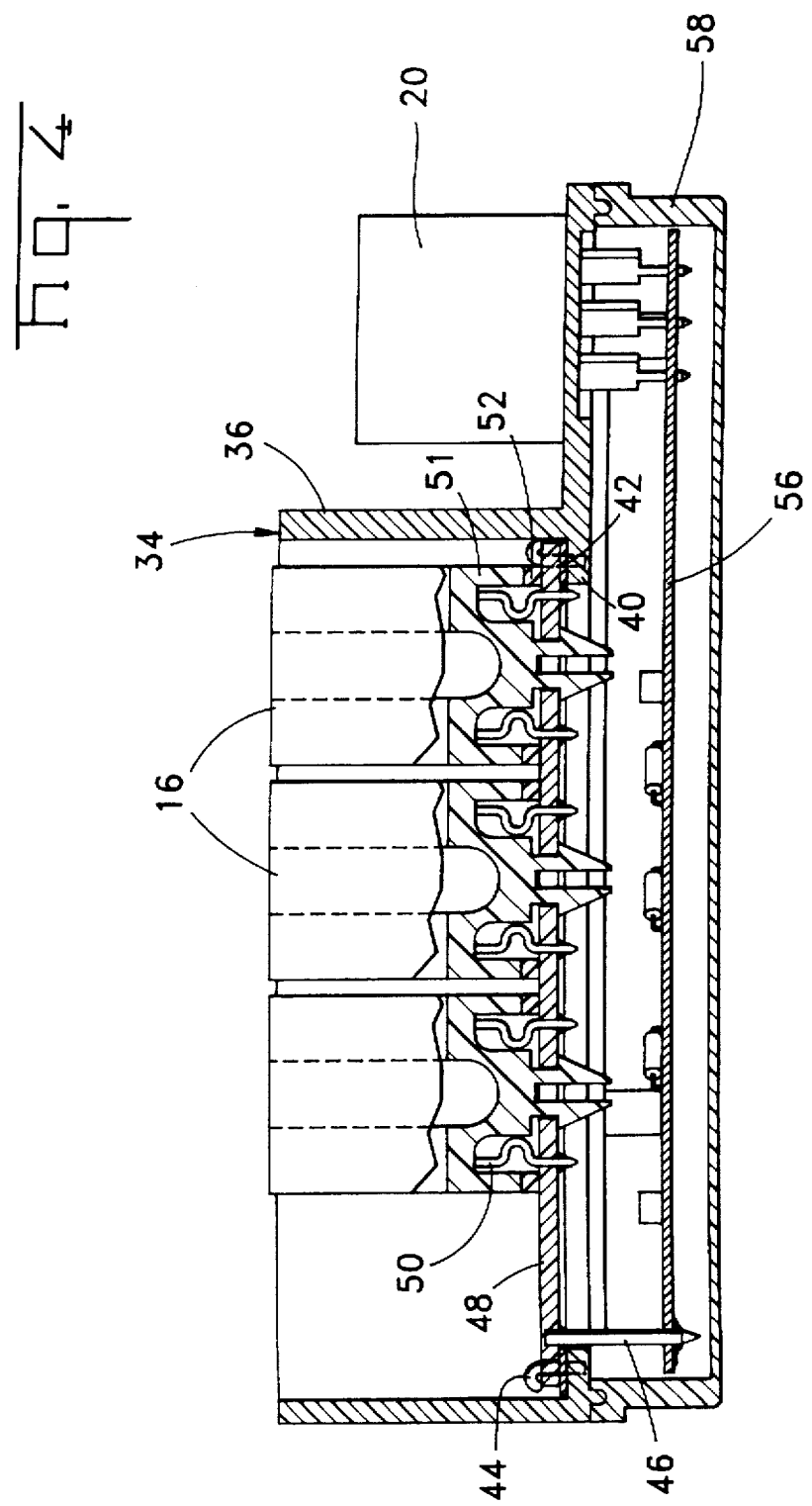

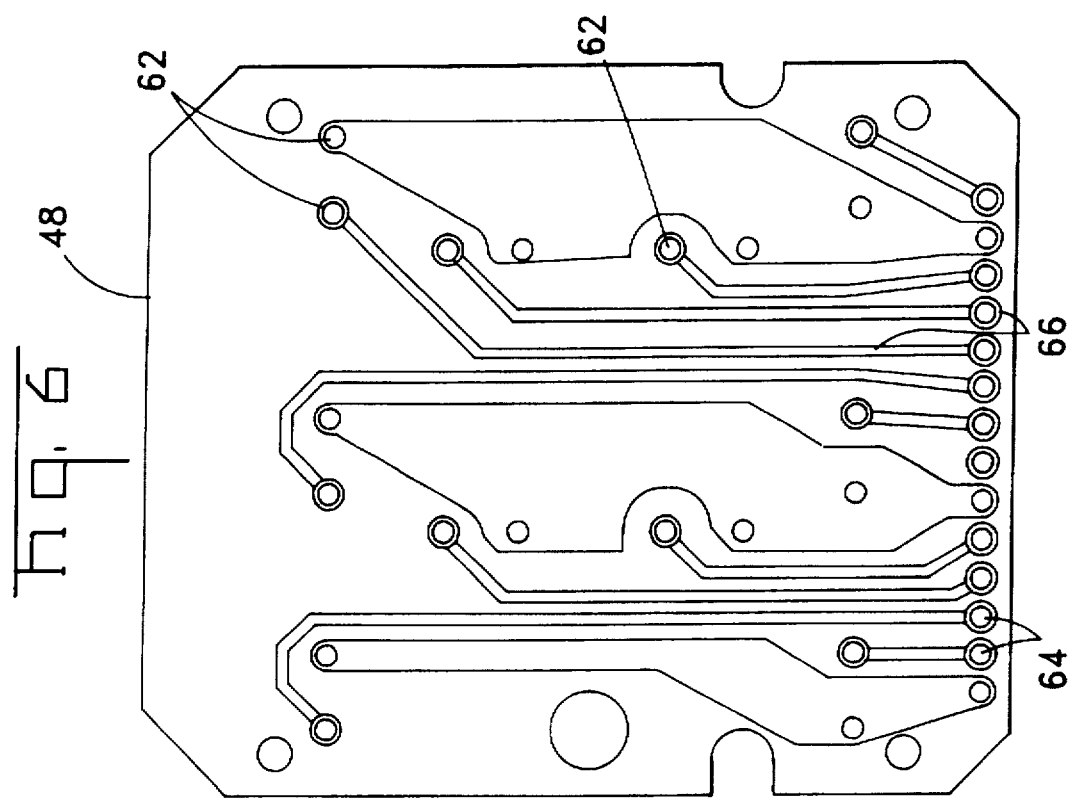
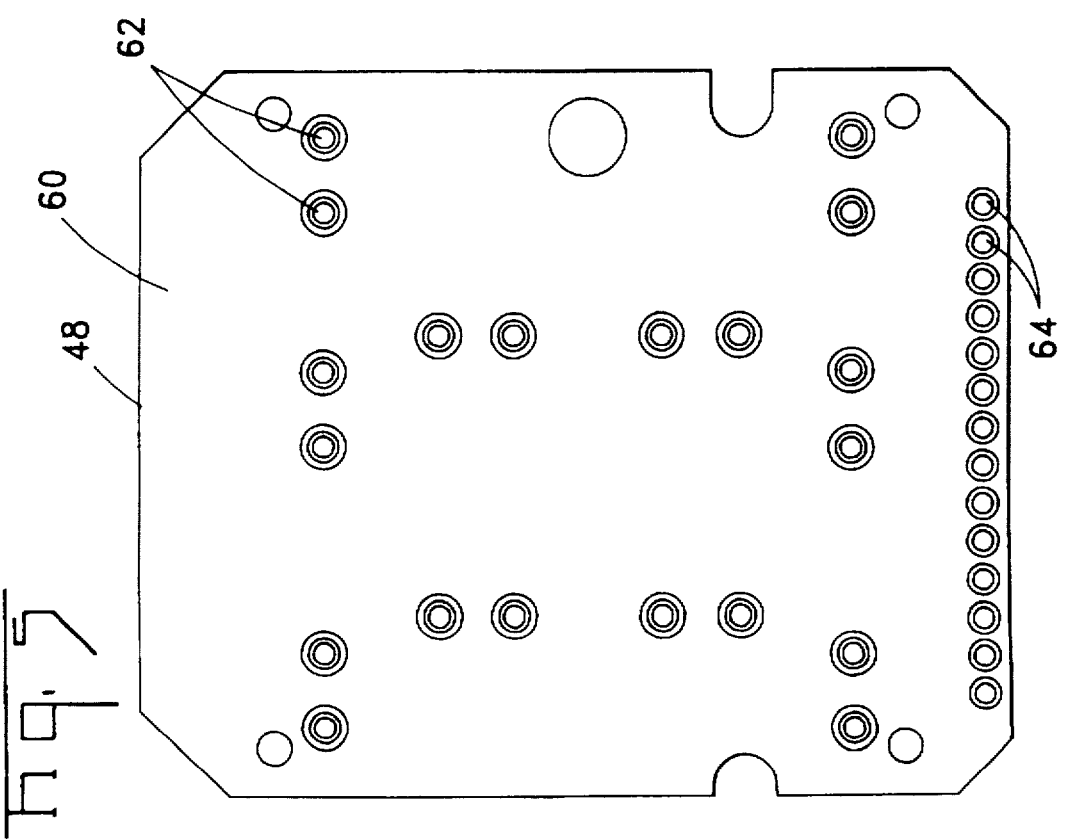

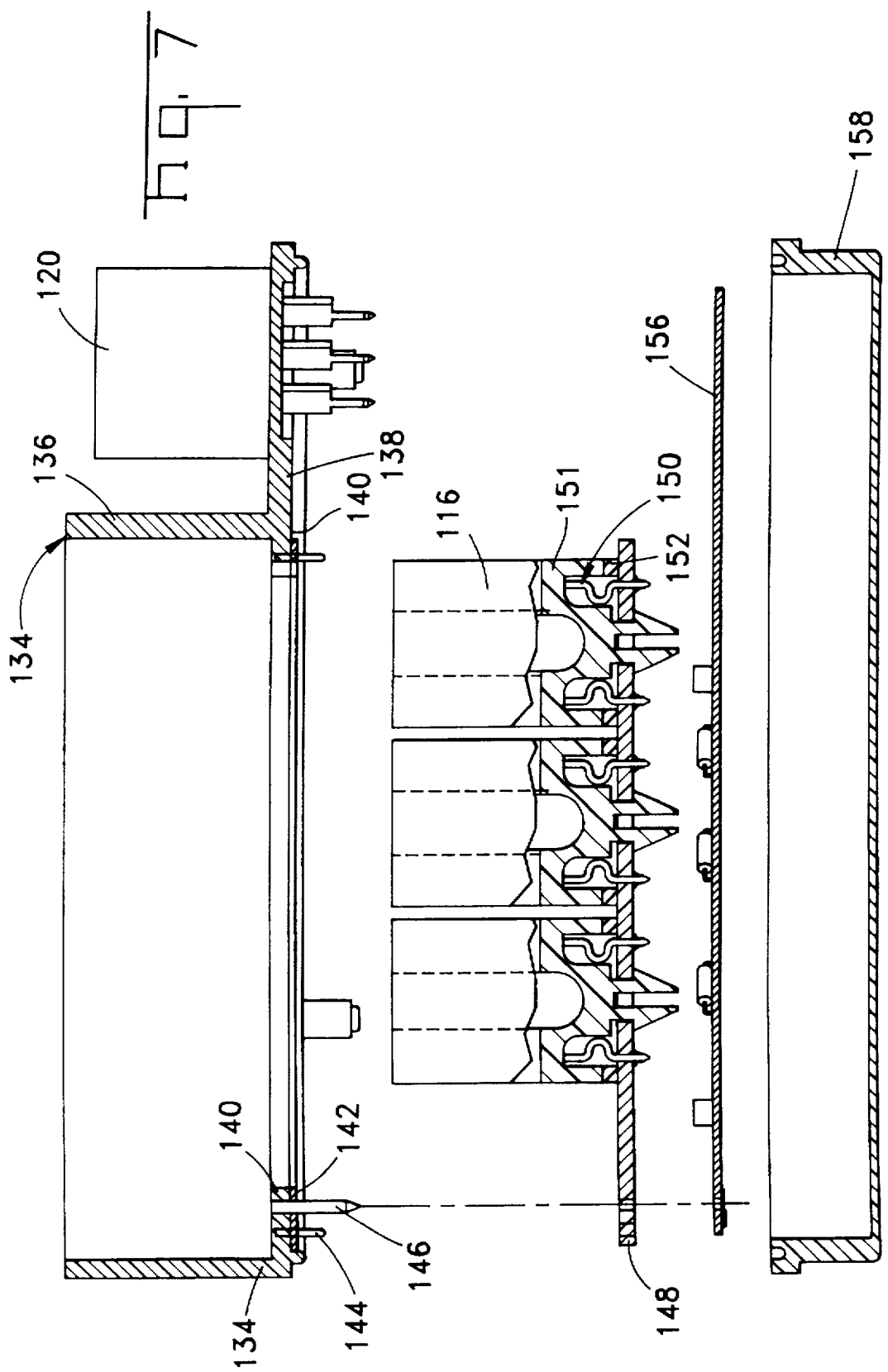

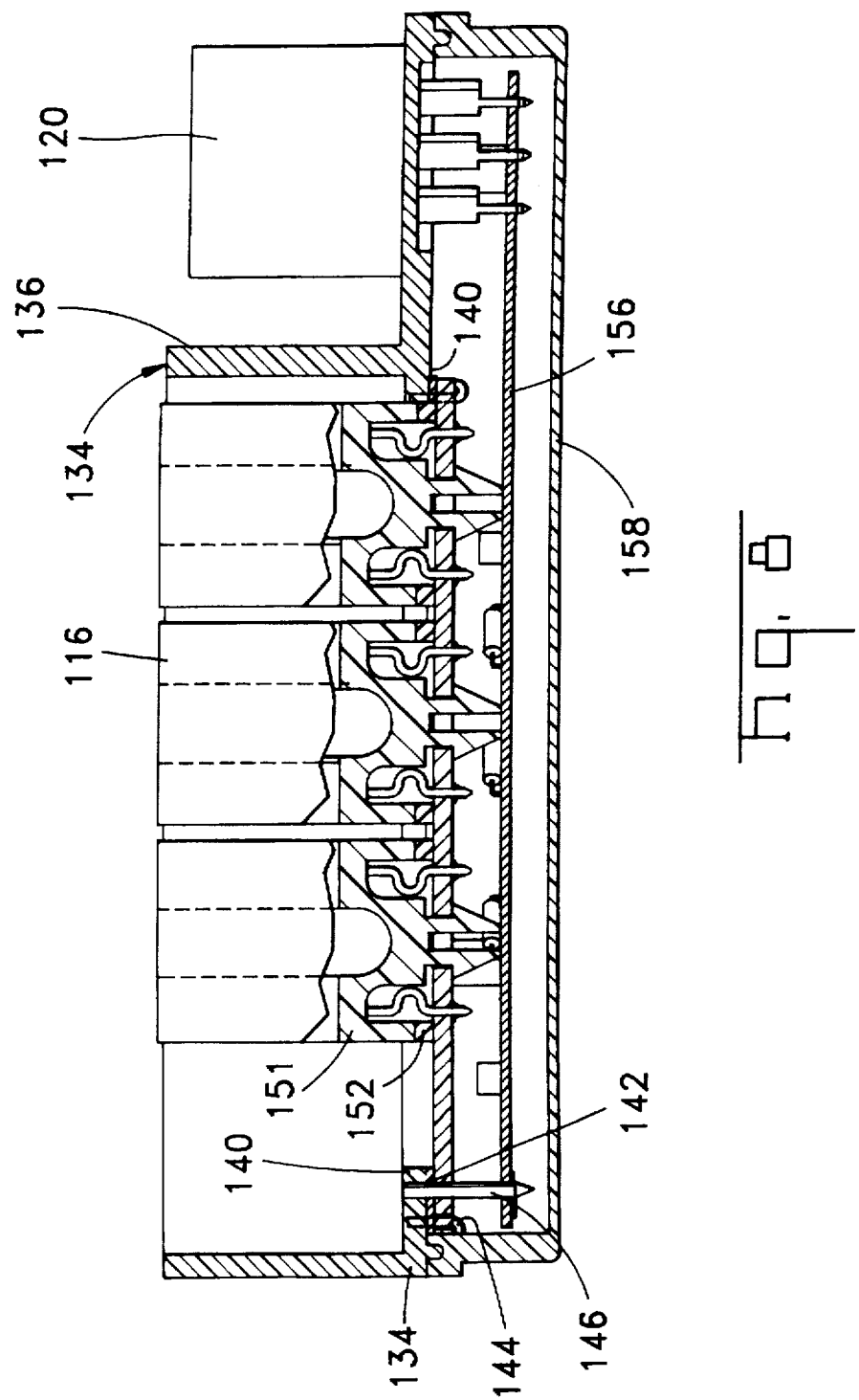

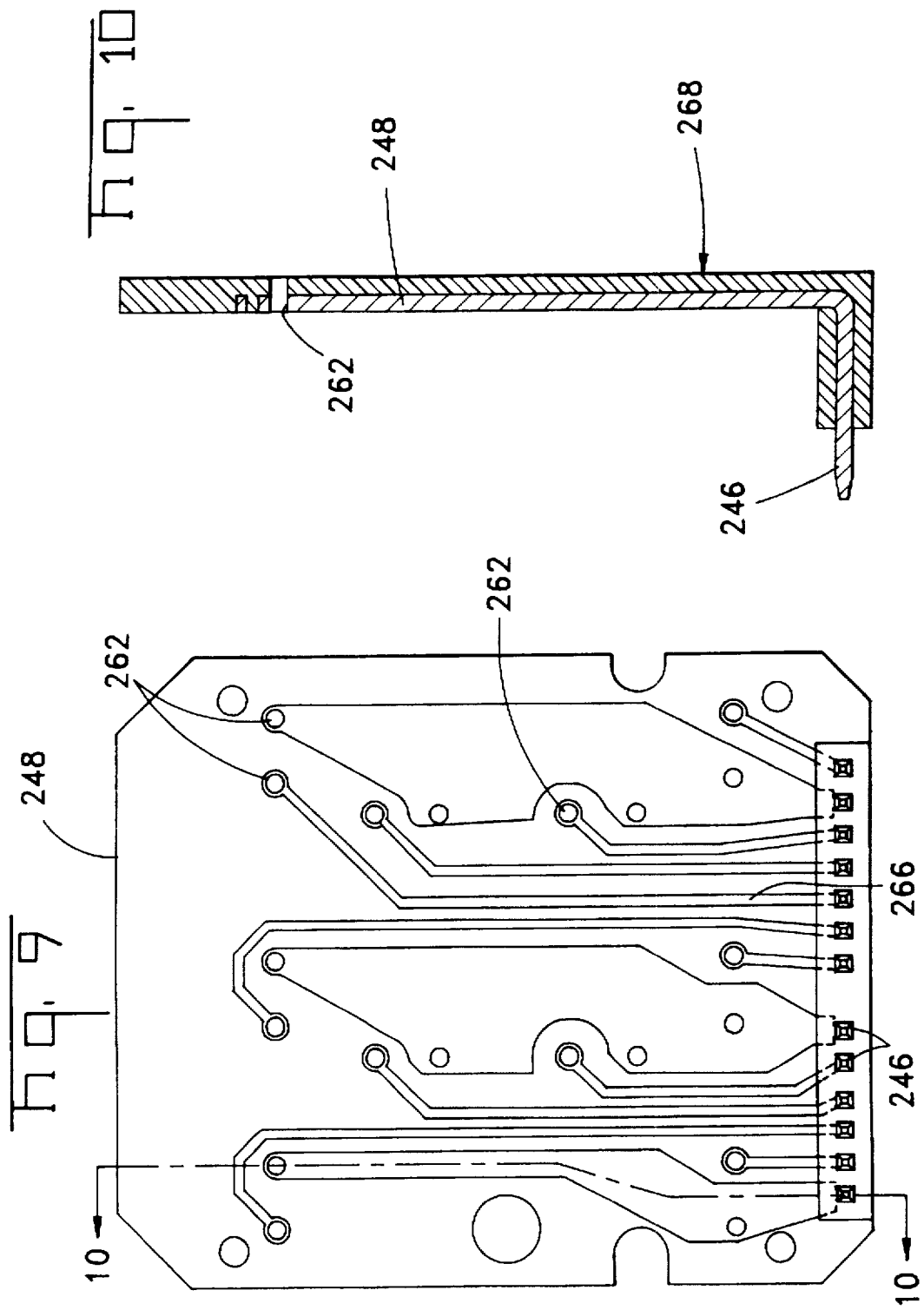

ELECTRICAL CONNECTOR ASSEMBLY WITH SEALED AND SPRING BIASED ELECTRICAL COMPONENT

CROSS REFERENCE TO RELATED APPLICATIONS

This application is a Continuation-in-Part of Ser. No. 08/320,621, filed Oct. 7, 1994, entitled "APPARATUS AND METHOD FOR ELECTRONICALLY CONTROLLED HYDRAULIC ACTUATOR", now U.S. Pat. No. 5,452,948.

BACKGROUND OF THE INVENTION

1. Field of the Invention

This invention relates to the fabrication of a sealed and shielded electrical connector assembly for use in an electrical system such as services an anti-lock braking system on an automobile. Hydraulic valves or actuators are controlled by an electronic control unit which applies electric current through an electrical connector to solenoid coils surrounding the valves to actuate the valves. The electrical connector assembly is sealed between a hydraulic subassembly and the electronic control subassembly.

2. Description of the Prior Art

The hydraulic unit for anti-lock braking systems on automobiles includes a hydraulic pump and an electrical control unit. The hydraulic pump or valve actuator unit of these devices includes a number of valves or domes in the form of cylindrical members or fingers. The valve element in these cylindrical members is actuated by the magnetic force induced by the current flowing in a toroidal solenoid coil in which the cylindrical member fits. Standard units can have six to ten valve actuators.

Commercially available systems employ an assembly consisting of two separate components. A hydraulic control unit containing the valves and coils for activating the valves are housed in one unit. An electronic control unit is located in a separate unit and connected to the hydraulic control unit by electric cable.

Other prior art systems have been designed in which the hydraulic control unit and the electronic control unit are housed as part of the same electrical connector assembly. In these single assembly configurations, the hydraulic control unit or subassembly must be isolated from the electronic control unit or subassembly. The two subassemblies must be hydraulically isolated. These single assembly prior art devices have solenoid coils located in a coil chamber located between the unit containing the hydraulic valves and the electronic control unit which applies a current to the appropriate coil to activate the corresponding valve. These coils have a winding mounted on a bobbin which is in turn encased in a metallic coil housing. Coil leads extend from the lower coil housing. A number of these individual coils are mounted in a coil chamber housing consisting of a plastic housing having pilars extending upward from the lower surface of the coil housing to define individual, substantially cylindrical, cavities into which individual coils are inserted. A gasket is positioned between the individual coil housing and the floor of the coil chamber housing to provide a resilient spring force between the coil and the floor.

After the coils are inserted in the coil chamber housing, the coil leads extend through openings in the floor of the coil chamber housing where they can be connected to the electronic control unit. This connection can be established by soldering the coil leads to a lead frame molded in the housing. Alternatively they can be soldered directly to a printed circuit board which comprises the main substrate for the electronic control subassembly.

Several different versions of these electrical connector assemblies, each containing a different number of coils, are commonly used. The same coil chamber housing is typically used for multiple configurations to eliminate the cost of multiple molds. In order to maintain the integrity of the floor of the coil chamber housing, which serves as a sealing bulkhead, these holes must be filled by a separate manufacturing operation, adding additional cost to the product. One method of filling these holes is to pot the lower portion of the inner chamber of the coil chamber housing.

After assembling the coils in the coil chamber housing, this subassembly can be tested for electrical continuity and integrity or this test can be done after interconnection of the coil to the electronic control unit. In either case, any defect in the coils or the coil subassembly will be difficult or impossible to repair, thus adding cost to the final product. Other electrical connector assemblies used in hydraulic applications are disclosed in U.S. Pat. No. 5,374,114 and U.S. Pat. No. 5,407,260, which are hereby incorporated by reference in their entireties.

SUMMARY OF THE INVENTION

In order to overcome the deficiencies of the prior connector systems, the present invention provides an electrical connector assembly comprising a sealing subassembly, the sealing subassembly provides a sealed barrier between first and second component subassemblies, the electrical connector assembly further comprises: a connector housing with mounting structure for attachment to the sealing subassembly, and the housing includes a sealing interface which extends around walls of the connector housing; a first component subassembly mounted on the housing frame, the first component subassembly comprises a material which is impermeable to the passage of fluid and sealingly engages the sealing interface, and the first component subassembly includes at least one electrical component with a contact electrically connected to at least one electrical conductor, the conductor extends from the electrical component to at least one corresponding electrical terminal which passes through the impermeable material; and a seal member in sealing contact with the sealing interface and the first component subassembly, the seal and the impermeable material thereby define a sealed bulkhead. The electrical component is mounted to a board of the first component subassembly, and the electrical component includes a sealing member attached thereto. The sealing member is disposed on a base of the electrical component, and preferably comprises a plastic, elastomeric, or metal material. The electrical component contacts are adapted to pass through an aperture of the sealing member. The electrical component is biasingly engaged by the sealing member thereby biasing the component away from the board, and the electrical contact comprises a bendable contact section, thereby permitting the electrical component to be movably mounted on the first component subassembly. The seal member biasingly engages a base of the electrical component, and the upper edge of the component receives a force exerting member which transmits a force to the seal member through the electrical component.

BRIEF DESCRIPTION OF THE DRAWINGS

FIG. 2 is a top plan view of the interior of a first embodiment of the peripheral housing frame in which the coil is mounted and to which the hydraulic actuator subassembly and the electronic control subassembly will be mounted.

FIG. 3 is a sectional view of the peripheral mounting frame to which a top loaded coil printed circuit board is mounted.

FIG. 4 is a sectional view similar to section 3 showing the assembly of the coil printed circuit board and the electronics control unit printed circuit board to the peripheral frame.

FIG. 5 is a view of one surface of the coil printed circuit board showing a substantially continuous conduction layer which serves as an electrical shield.

FIG. 6 is a view of the opposite solder side of the coil printed circuit board showing the traces connecting individual coils to terminals for connecting the coils to the electronic control unit.

FIG. 7 is a view similar to the view of FIG. 3, but showing an embodiment in which the coil printed circuit board is mounted from the bottom.

FIG. 8 is a sectional view similar to FIG. 4 showing of the components of the embodiment of FIG. 7 in their assembled configuration.

FIG. 9 is a view of an insert molded wiring board which can be used instead of a conventional fiberglass printed circuit board laminate.

FIG. 10 is a sectional view of the insert molded wiring board taken along section lines 10—10 in FIG. 9.

DETAILED DESCRIPTION OF THE PREFERRED EMBODIMENTS

Figure 1:
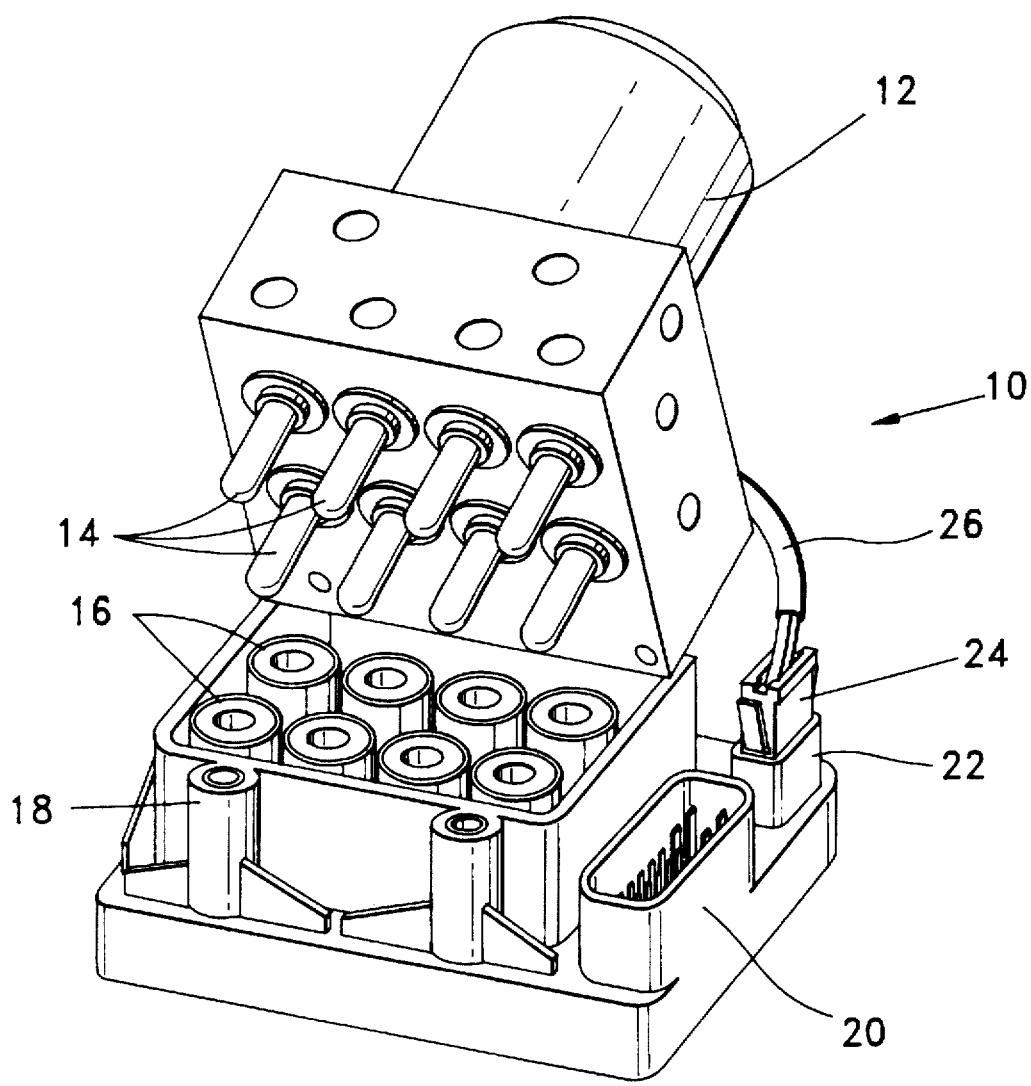
FIG. 1 is a view of the hydraulic unit in which the hydraulic unit containing the pump and valves with the hydraulic control unit shown partially removed to depict the coils and the valves.

The electronically controlled hydraulic unit 10 shown in FIG. 1 is intended for use in an anti-lock braking system in an automobile. As shown in FIG. 1, the hydraulic actuator unit, subassembly or pump 12 is shown partially removed to expose the interior of the unit. More specifically the orientation of FIG. 1 is intended to show the valve actuators 14 on the hydraulic unit 12 and the solenoid coils 16. The pump 12 and the valve subassembly containing valves 14 are part of the same hydraulic actuator subassembly. The valve actuators 14 are referred to as domes and comprise generally cylindrical members. When the unit is properly assembled, these valve actuators extend through the center of the toroidal coils 16 so that the magnetic field induced by the application of an electrical current to the coils 16 causes the valve located in the corresponding valve actuator member 14 to move between a seated and an unseated position. Bosses 18 which receive conventional fastening members, not shown are shown on the exterior of the body of the assembly. For example bolts extending upward through bosses 18 could be used to attach the hydraulic subassembly 10 in position. Other conventional fastening means, such as clamps, or other similar devices known to one skilled in the art could also be employed.

The hydraulic unit 10 also includes an input output connector 20 located on the exterior of the coil chamber in which the coils 16 are located. This electrical connector 20 provides for the input and output of both electrical power and signal currents to the device. A second connector in the form of header 22 mates with connector 24 to deliver power over external cable 26 to the hydraulic pump 12.

FIG. 2 is a top plan view of the peripheral coil mounting housing frame 34 of the first embodiment of this invention. Signal terminals or pins 30 and power pins 32 in connectors 20 and 22 are visible in this view. These pins can be stitched in the plastic coil mounting housing 34 in a conventional manner. The coil mounting housing 34 has continuous peripheral sidewalls 36 extending upward from the base of the housing 34 to form a coil chamber in which a plurality of coils 16 can be located. The sidewalls are shown more clearly in FIG. 3. The pin header connectors 20 and 22 are located on an extension of the base 38 of the coil mounting housing 34. The coil mounting housing 34 also contains a sealing rim 40 consisting of an upwardly facing surface surrounding the central area in which the coils will be positioned. In the embodiment of FIG. 2, this sealing rim comprises an upwardly facing surface which extends completely around the inner periphery of the sidewalls 36.

The exploded section view of FIG. 3 shows the components of the coil mounting subassembly 28, the electronic control unit control board 56 and the lower cover 58. The coil mounting subassembly 28 comprises the coils 16 mounted to coil printed circuit board 48, which is mounted in the coil mounting housing 34 formed by sidewalls 36, and a resilient seal 42 which maintains sealing integrity between the coil printed circuit board 48 and the coil housing 34. In this embodiment a plurality of electrical contact terminals in the form of pins 46 are also mounted on the coil printed circuit board 48. These pins are shown in a conventional single row configuration. Board 48 is preferably formed of an insulating material which is impermeable to the passage of fluid.

Each of the coils 16 has two coil leads 50 extending from the bottom. These coil leads are bent to provide resiliency so that the solder joint will not be stressed when a compressive load is applied to the coil in the direction parallel to the axis of the coil. Although not shown, these coils are otherwise conventional in construction. A winding on a bobbin is housed in a metallic coil enclosure with the coil leads extending axially from the bottom of the bobbin. A coil seal or gasket 52 is positioned between each coil 16 and the printed circuit board 48. The coil seal gasket can be formed of an elastomeric, plastic, or metal material; however, it must perform both sealing and spring functions. In the embodiment shown herein this gasket is secured to the outer periphery of a coil mounting seat 51 which includes a snap in hold down feature 54 extending from the center of the gasket. This hold down feature extends through a hole in the coil printed circuit board and secures the coil to the printed circuit board. This coil seat can be secured to the printed circuit board and the coil can be subsequently snapped in to engagement with this seat 51. Alternatively the hold down seat can be insert molded to the coil 16 and its outer metal coil housing and the hold down feature 54 can be used to secure the coil 16 to the printed circuit board 48. When the gasket or seal 52 is compressed a seal is formed prohibiting the passage of fluids through the printed circuit board hole in which the hold down is located. In addition to providing seal integrity, this seal or gasket 52 also imparts resilience to the coils so that when downward load toward the coil printed circuit board is applied to the coil, the seal or gasket resists that force and urges the coil upward. This significance of this resilience will be subsequently described. It should be understood that the seal or gasket 52 can also be mounted to the coil 16 by insert molding seal to the exterior of the coil body.

The sidewalls 36 on the coil mounting housing are shown in section in FIG. 3. FIG. 2 shows that these sidewalls are continuous to form a frame or shroud extending around all four sides of the coil cavity defined by the housing 34. This cavity is open on both the top and the bottom of sidewalls 36. A sealing rim 40 having an upwardly facing surface extends completely around the inner periphery of the upstanding sidewalls 36. The opening is defined by this sealing rim is smaller than the coil printed circuit board 48 so that the coil printed circuit board overlaps the sealing rim 40 around its entire peripheral length. A seal 42 is positioned on the upper surface of the sealing rim 40 between the sealing rim and the coil printed circuit board 48. This seal 42 may be a resilient member or it may be a viscous sealing material deposited on the sealing rim. Conventional materials are available to form a suitable seal of this type when placed under compression. In this configuration, the coil wiring board subassembly, comprising a plurality of coils 16 soldered to the coil printed circuit board 48, is mounted in the coil housing 34 by inserting the coil wiring board subassembly in the open top of the housing 34. The coil printed circuit board 48 can then be seated on the sealing rim with the seal 42 maintaining sealing integrity therebetween. One or more staking pins 44 extending upwardly from the housing 34 can be bent over to hold the coil printed circuit board securely in place.

FIG. 4 shows coil subassembly secured to the coil housing 34. FIG. 4 also shows the assembled configuration of the electronic control printed circuit board 56. As depicted herein, this printed circuit board contains a number of components, shown here only in representative form. The exact configuration of this control board does not form part of the subject matter of the invention disclosed herein. This control board subassembly includes the hardware of the electronic control subassembly or unit. Note that pins 46 can be soldered to control board 56 after assembly of the coil board 48 in housing 34. As part of the same operation, the pins in the input/output header 20 can also be soldered to control board 56 after assembly of the coil printed circuit board 48 now forms a sealing bulkhead above the control board 56. As shown in FIG. 4, the tops of coils 16 extend above the upper edge of the sidewalls 36 of the housing frame 34. When the hydraulic actuator subassembly is secured the subassembly shown in FIG. 4, the lip surrounding the base of the valves engage the tops of the metal coil housing of coils 16 forming a tight metal to metal interface. The coils are forced down and the resilient coils sealing members 52 exert a force urging the metal coil housings of coils 16 upward into engagement with valve lips. A continuous magnetic flux path is thus formed through the coil housing and the metal valves.

FIGS. 5 and 6 show both sides of the double sided coil printed circuit board 48. FIG. 5 shows the bottom or solder side of the board. Plated through holes 62 are provided so that the coils 16 can be soldered to this board. Header 64 is a connector with a plurality of terminals or pins 46 soldered to the printed circuit board 48. These pins can be soldered in plated through holes which are obstructed by the presence of the header in FIG. 5. Substantially all of the side of the printed circuit board 48 shown in FIG. 5 has a substantially continuous conductive surface 60 which can serve as a shield against passivation. In the preferred embodiment, this conductive surface 60 comprises a layer of copper deposited on the insulative substrate. Portions of this copper layer surrounding the plated through holes 62 have been etched to provide an annular insulating area surrounding the solder joints connecting the coils 16 and the pins 46 to the plated though holes. This conductive layer can serve as a shield since it is positioned on one side of the control printed circuit board 56. This conductive layer could also serve as a ground plane. The electronic circuits on this control board can thus be shielded from electromagnetic radiation along this side of the assembly. Alternatively this shield would also prevent radiation emanating form the electronic control circuit from affecting other components. FIG. 6 shows the opposite coil mounting or component side of printed circuit board 48. The traces 66 which would connect the coils 16 to the pins 46 are shown in FIG. 6. In the preferred embodiment this printed circuit board would be a conventional 0.062 inch thick FR-4 printed circuit board. Alternatively thicker boards could be employed.

FIGS. 7 and 8 show an alternative version of assembly in which the printed circuit board 148 is mounted to the peripheral housing frame 134 from the bottom instead of from the top as in the embodiment of FIGS. 2–6. FIGS. 7 and 8 show the bottom mounted embodiment in a fashion analogous to the way that FIGS. 3 and 4 show the top mounted embodiment. The sealing rim 140 comprises a downwardly facing annular surface along which the seal 142 is located. This seal 142 engages the top surface or component side of the coil printed circuit board 148. In the embodiment of FIG. 7, the terminals or pins 146 are not initially mounted in a printed circuit board header as for the top mounted version. In this embodiment the pins 146 are stitched in the housing 134 using a conventional terminal assembly stitching machine. Thus the pins are not soldered to the coil printed circuit board 148 until after this board is mounted on the housing frame 134. This embodiment does require staking or mounting pins 144. Other components of the second embodiment perform similar functions to the corresponding component of the first embodiment. This similarity is represented by using a "1" prefix for the corresponding component. For example coil 116 corresponds to coil 16 of the first embodiment.

The first and second embodiments of this invention show the use of a conventional copper laminate printed circuit board. These printed circuit boards comprise only one type of wiring board which can be employed. FIGS. 9 and 10 show an insert molded wiring board 248 in which a stamped and formed lead frame is used. Insert molding in a conventional operation in which the lead frame is mounted in a mold and then plastic is injected around the lead frame. Portions of the lead frame are then severed to form distinct traces which serve the same purpose as traces on conventional printed circuit boards. As shown in FIG. 9 these lead frame traces include holes 262 through which coil leads 52 can be inserted. Solder pads, which are integral portions of the lead frame traces, surround these holes and the coil leads can be soldered directly to these pads in conventional fashion. As shown in FIG. 10, the pins 246 are also integral portions of the lead frame which have been formed at right angles to the portion of the lead frame which forms the traces. Plastic has been insert molded around portions of the pin 246 leaving the ends of the pins exposed for soldering to the control board. This plastic surrounding pins 246 can serve as wiring board separators and it also serves to secure the lead frame to the plastic substrate. The insert molded wiring board 248 of the type shown in the embodiment of FIGS. 9 and 10 can be substituted directly for the printed circuit boards 48 and 148 of the first two embodiments.

The assembly operations of both embodiments of this invention are conventional and these components are reliably manufacturable. The components are first soldered to the wiring or printed circuit board using conventional soldering operations. For example, the components can be wave soldered. If the first embodiment is wave soldered, a secondary operation will be necessary to remove solder deposited on the pins 46. This operation can be performed with a hot air knife and is a conventional operation. Alternatively solder paste can be deposited on printed circuit pads adjacent to the plated through holes, and a surface mount operation, such as reflow soldering can be used to solder the coils and the pins to the printed circuit board. These same conventional offline soldering operations can also be employed to solder coils to the insert molded wiring board 248 of FIGS. 9 and 10. The seals 24 can be molded elastomer seals or a viscous sealant can be deposited along the sealing rim. This sealant can also be an adhesive. The materials used for the seal are conventional and readily available. The housing frame is an injection molded member which can be easily fabricated. No special materials are necessary. Pins 46, 146 or 246 can also be soldered to the control boards 56 and 156 can be soldered using conventional techniques.

Although three embodiments are depicted herein, it will be appreciated by those skilled the art that numerous other equivalent embodiments can be used in the same manner as those depicted herein. These two embodiments are intended to be representative only.

We claim:

1. An electrical connector assembly comprising a sealing subassembly, said sealing subassembly provides a sealed barrier between first and second component subassemblies, said electrical connector assembly comprises:

a connector housing with mounting structure for attachment to said sealing subassembly, and said housing includes a sealing interface which extends around walls of the connector housing;

a first component subassembly mounted on the housing frame, said first component subassembly comprises a material which is impermeable to the passage of fluid and sealingly engages said sealing interface, and said first component subassembly includes at least one electrical component with a contact electrically connected to at least one electrical conductor, said conductor extends from the electrical component to at least one corresponding electrical terminal which passes through the impermeable material, the electrical component is mounted to a board of said first component subassembly, and said electrical component includes a sealing member attached thereto, the electrical component being biasingly engaged by said sealing member thereby biasing said component away from said board; and a seal member in sealing contact with said sealing interface and said first component subassembly, said seal and said impermeable material thereby define a sealed bulkhead.

2. The electrical connector assembly of claim 1, wherein said housing walls comprise a cavity therebetween which receives said electrical component therein.

3. The electrical connector assembly of claim 1, wherein said sealing member is disposed on a base of said electrical component.

4. The electrical connector assembly of claim 1, wherein said sealing member comprises an elastomeric material.

5. The electrical connector assembly of claim 1, wherein an said sealing member comprises a ring shape.

6. The electrical connector assembly of claim 1, wherein said electrical component contact passes through an aperture of said sealing member.

7. The electrical connector assembly of claim 1, wherein said sealing member is compressible.

8. The electrical connector assembly of claim 1, wherein said electrical component comprises structure which mounts said component to said board by engagement therewith.

9. The electrical connector assembly of claim 1, wherein said electrical component comprises structure which mounts said component to said board by engagement therewith.

10. The electrical connector assembly of claim 1, wherein said sealing member is compressible, and said electrical contact comprises a bendable contact section, thereby permitting said electrical component to be movably mounted on said first component subassembly.

11. The electrical connector assembly of claim 1, wherein said housing walls comprise a cavity therebetween which receives said electrical component therein, and said electrical component comprises an upper edge located relatively away from said electrical contact.

12. The electrical connector assembly of claim 11, wherein said upper edge extends out of said cavity.

13. The electrical connector assembly of claim 11, wherein said sealing member biasingly engages a base of said electrical component for biasing the component.

14. The electrical connector assembly of claim 11, wherein said sealing member biasingly engages a base of said electrical component, and said upper edge receives a force exerting member which transmits a force to said sealing member through said electrical component.

* * * * *